(12) United States Patent
Fathollahi

(10) Patent No.: US 9,432,074 B2
(45) Date of Patent: Aug. 30, 2016

(54) PROTECTIVE CASE FOR MOBILE DEVICE WITH REINFORCING SUPPORT MEMBER

(71) Applicant: Incipio, LLC, Irvine, CA (US)

(72) Inventor: Andy Fathollahi, Corona Del Mar, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

(21) Appl. No.: 14/865,233

(22) Filed: Sep. 25, 2015

(65) Prior Publication Data

US 2016/0094263 A1    Mar. 31, 2016

Related U.S. Application Data

(60) Provisional application No. 62/056,477, filed on Sep. 26, 2014.

(51) Int. Cl.
| | |
|---|---|
| *H04M 1/00* | (2006.01) |
| *B29C 45/14* | (2006.01) |
| *H04B 1/3888* | (2015.01) |
| *B29K 101/12* | (2006.01) |
| *B29K 305/00* | (2006.01) |
| *B29K 303/00* | (2006.01) |
| *B29L 31/34* | (2006.01) |

(52) U.S. Cl.
CPC ....... *H04B 1/3888* (2013.01); *B29C 45/14631* (2013.01); *B29K 2101/12* (2013.01); *B29K 2303/00* (2013.01); *B29K 2305/00* (2013.01); *B29L 2031/3481* (2013.01)

(58) Field of Classification Search
CPC .................. B29C 45/14631; B29K 2101/12; B29K 2303/00; B29K 2305/00; B29L 2031/3481; H04B 1/3888

See application file for complete search history.

(56) References Cited

U.S. PATENT DOCUMENTS

| | | | | |
|---|---|---|---|---|
| 8,383,216 | B1* | 2/2013 | Hynecek | B29D 22/003 156/242 |
| 2013/0113348 | A1* | 5/2013 | Holben | H05K 5/03 312/223.1 |
| 2014/0092536 | A1* | 4/2014 | Dukerschein | H05K 5/02 361/679.01 |
| 2014/0274232 | A1* | 9/2014 | Tages | H04B 1/3888 455/575.8 |
| 2016/0006474 | A1* | 1/2016 | Zhang | H04B 1/3888 455/575.8 |

* cited by examiner

*Primary Examiner* — Kashif Siddiqui
(74) *Attorney, Agent, or Firm* — Manatt, Phelps & Phillips, LLP

(57) ABSTRACT

A protective case for a mobile device having a co-molded multi-layered construction having a first layer that generally forms the external back face surface of the case. A second layer generally forms the perimeter bumper of the case. The first layer is comprised of material that has a hardness and/or rigidity that is greater than the second layer. The layers are configured to interact with one another so that they are capable of distributing impact forces to mitigate damage to the mobile device. One or more reinforcing support members in the form of a beam or rod are provided and extend internally and longitudinally near the sides of the case and preferably near the long sides of a rectangular shaped case. The reinforcing support members are formed of even harder or more rigid materials, such as metal alloy or cured fiber reinforced composite rods or beams, relative to the first and second layer and are capable of providing additional support and rigidity to the mobile device to stop or mitigate unintentional or undesired bending of the mobile device.

15 Claims, 11 Drawing Sheets

PROTECTIVE CASE FOR MOBILE DEVICE WITH REINFORCING SUPPORT MEMBER

INCORPORATION BY REFERENCE TO RELATED APPLICATIONS

This application claims benefit under 35 U.S.C. §119(e) from U.S. Provisional Application No. 62/056,477, filed on Sep. 26, 2014, which is hereby incorporated by reference in its entirety.

BACKGROUND OF THE INVENTION

1. Field of the Invention

This patent document relates to user removable protective enclosures or cases for mobile electronic devices and more particularly to such cases that have a reinforcing support member.

2. Description of the Related Art

Mobile consumer electronic products, such as smart and cellular phones, computing tablets, MP3/audio/video players, gaming devices and laptops are continuously and rapidly evolving to meet expanding consumer demands. Typically, such devices include an external enclosure or encasing that house the electronics of the device and an interactive touchscreen on one or more faces of the device. With each passing day, such devices are becoming more and more powerful, connected, and interactive; employ bigger and bigger screens and better and more numerous cameras; and now run what is seemingly countless specific applications and features that address any conceivable need. Indeed, they are becoming so commonplace in today's society that it is now hard to remember life without them.

Manufacturers, while racing to provide such enhanced functionality, are also increasingly very sensitive to increases in the overall weight and bulkiness of their devices. As a result they are decreasing the thickness to offset increases in screen size. For example, the most recent generation of iPhone 6 Plus, introduced in September 2014, is just over half the thickness of the original iPhone (1$^{st}$ generation) introduced in 2007, yet provides approximately double the screen space. As a result, these devices, which are commonly encased within metallic housings, are becoming more and more susceptible to undesirable or unintentional bending, which can impair the functionality of the screen and buttons, and/or expose or damage the electronics within the device.

The inventors here have recognized, therefore, that there is a need to develop protective cases for such mobile electronic devices that are capable of providing additional reinforcing support to mitigate or prevent bending of the device while minimizing bulkiness and weight and yet maintain a high level of protection.

SUMMARY OF THE INVENTION

Disclosed are numerous aspects of a unique and inventive protective case configured to receive, retain and protect a mobile device that includes a front face and a back face that define the height or thickness of the mobile device, a perimeter defined by top-end, bottom-end, right, and left sides residing between the front and back faces, and corners defined at the intersecting regions of the sides. The case may be for a mobile electronic device that is in the form of a tablet, a mobile phone, an MP3 audio player, a gaming device, or other portable handheld electronic device and may have one or more touchscreens on its front face and/or back face.

The protective case is, in a first aspect, comprised of three primary components, a bottom shell portion, an upper portion, and one or more reinforcing support members. The bottom shell portion is dimensioned and configured to reside below the back side or face of the electronic device. The upper portion generally extends from the bottom shell portion and is dimensioned and configured to cover at least a portion of one or more sides and/or a portion or a perimeter portion of the front face of the mobile device. In an illustrated implementation, the one or more reinforcing support members are housed or otherwise located and retained within the bottom shell portion.

The bottom shell portion may be co-molded with the upper portion as respective first and second layers, wherein the bottom shell portion layer may be made of a material that is more rigid than the co-molded upper portion layer. The bottom shell portion may be formed, for example, of a polycarbonate (PC) material while the upper portion layer may be formed of less rigid thermoplastic urethane (TPU), a thermoplastic elastomer (TPE), an acrylonitrile butadiene styrene (ABS), nylon, silicone rubber or a combination thereof. Additional layers may also be co-molded or otherwise incorporated into the protective case.

The reinforcing support member may be formed of a third material that is different from either the material that forms the bottom shell portion or the material that forms the upper portions and may provide additional support and rigidity to the mobile device via the protective case. It is contemplated, for example, that the reinforcing support member may be formed of metal or metal alloy such as a steel, stainless steel, tungsten, titanium or magnesium alloy and/or may be formed of a composite (hardened or cured) fiber reinforced structure or lay-up of directionally oriented fibers and/or non-directionally oriented (e.g., randomly oriented) fibers with or without an internal core component or substrate. The reinforcing support members may be circular, oval, square or rectangular in cross-section or a combination thereof and may be uniform in size and shape or may vary in size and shape from one region to another of the support member.

The one or more reinforcing support members may be co-molded with the bottom shell and/or upper portions and/or may be inserted after molding within a cavity formed within the components. The reinforcing support members, in another aspect, may be formed of a material that is more rigid and/or may be a greater bending stiffness than the material that forms either the bottom shell portion or the upper portion of the case.

The reinforcing support members may be constructed uniformly along its longitudinal length or may be constructed with greater or lesser rigidity along its length by increasing its dimensions and/or by virtue of selection of construction materials at a particular longitudinal region. For example, the reinforcing support member may be formed more rigidly near the regions that are configured to be positioned adjacent the buttons of the electronic device (e.g., volume buttons) by, for example, increasing the dimensions of the reinforcing support member in those adjacent residing regions.

In one aspect, the protective case may be manufactured by placing the reinforcing support members (e.g., steel rods) in a mold configured to define the shape of the bottom shell portion. The reinforcing support members may run the full length or the majority of the length of the case and/or the electronic device that the case is configured to receive. The reinforcing support members may be positioned within the case so as to be configured to run lengthwise near or under the longitudinally extending edges of the electronic device so as to extend between the top and the bottom ends or sides of the device and/or case on the right and/or left sides thereof.

Multiple reinforcing support members may be employed and each may be formed of the same and/or different materials and may be positioned along or under the left and/or right sides of the electronic device or positioned more centrally and inwardly from the side walls. Once the reinforcing members are positioned in the desired location in the mold, the mold can be injected with a first polymer material (e.g. PC) on top of the reinforcing support members to form the bottom shell portion containing there within the reinforcing support members to form a first molded construct. The first molded construct is then inserted into another mold that is configured to form the upper portion of the case. Once the first molded construct is positioned in the second mold, the second mold is injected with a second more pliable polymer material (e.g. TPU) that is co-molded to the first molded construct and the first polymer material.

The one or more reinforcing support members may be housed within the bottom shell portion base section of the wall structure (e.g., reference numeral 220, best seen in FIG. 4) without increasing the thickness of the wall. Alternatively, as illustrated in the drawings, the bottom shell portion (e.g., reference numeral 300, also best seen in FIG. 4) may be configured to include one or more outwardly extending protrusions (e.g., reference numeral 360 in the drawings) that house the one or more reinforcing support members. The outwardly extending protrusions may be configured to extend lengthwise along the backside of the case and protrude outwardly in a direction away from the back face of the electronic device so as to create ridges, footings or rails (e.g., reference 362, best illustrated in FIGS. 1C-1D and FIG. 5B) on the backside of the case that are capable of elevating the electronic device above a resting surface, which may further protect the electronic device from accidental spills by elevating it from the surface upon which the case is resting. The outward protrusions may be configured include apertures that allow visibility to the reinforcing member(s) housed therein. In this way the user may be able to visibly detect whether the reinforcing member is fractured or stressed or whether it remains sound operating condition.

The outwardly extending protrusions on the back side of the bottom shell may be constructed with multiple reinforcing support members of the same or different configurations and constructed with the same or different materials. Alternatively, the outwardly extending protrusions may be constructed without the incorporation of any reinforcing support member. In the later construction, the outward protrusions extending lengthwise on the backside of the bottom shell portion may provide additional support and rigidity to the mobile device via the protective case.

It should be understood that each of the foregoing and various aspects, together with those set forth in the claims and summarized above or otherwise disclosed herein, including the drawings, may be combined to form claims for a device, apparatus, system, method of manufacture, and/or use without limitation.

BRIEF DESCRIPTION OF THE DRAWINGS

These and other features, aspects and advantages are described below with reference to the drawings, which are intended to illustrate but not to limit the invention. In the drawings, like reference characters or numerals denote corresponding features consistently throughout disclosed embodiments.

Figure 1A:
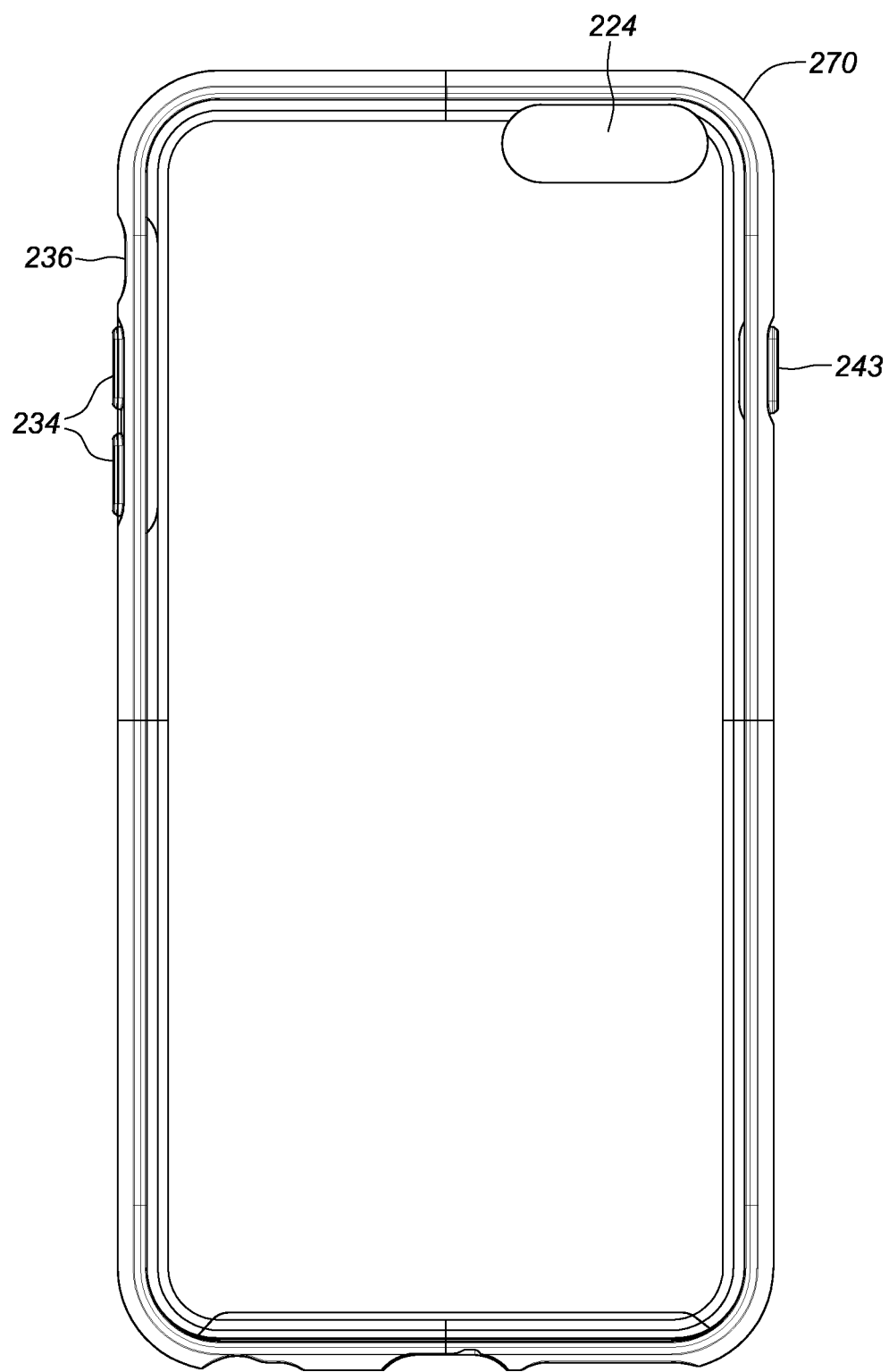
FIGS. 1A-1F are front face, back face, left side, right side, top side and bottom side views, respectively, of one embodiment of a protective case for a mobile device in accordance with the teachings herein. The protective case depicted is configured or dimensioned to receive and retain an Apple iPhone 6 Plus® smart phone (see www.apple.com), a device that is well known to those in the art
Figure 1B:
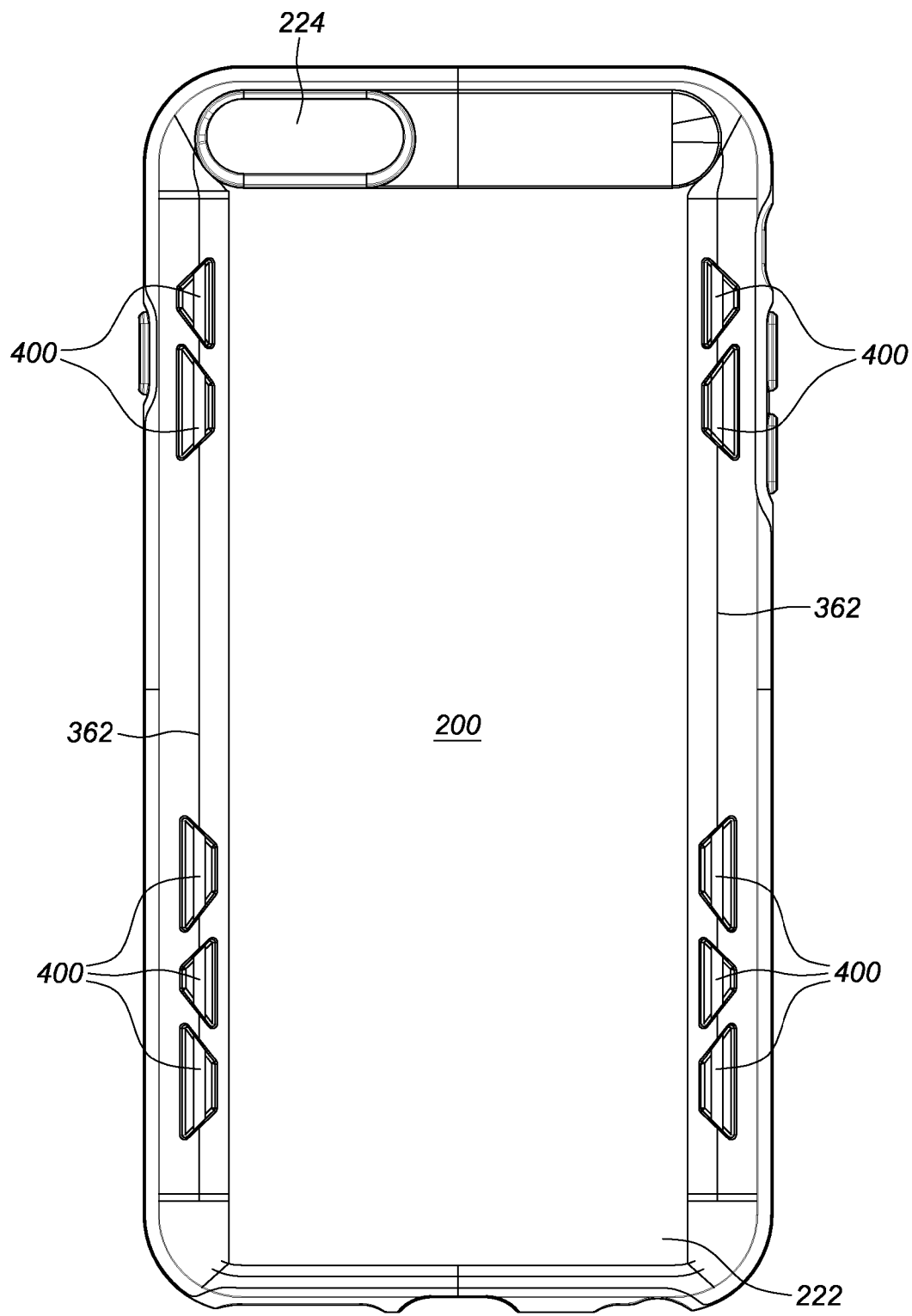
Figure 1C:
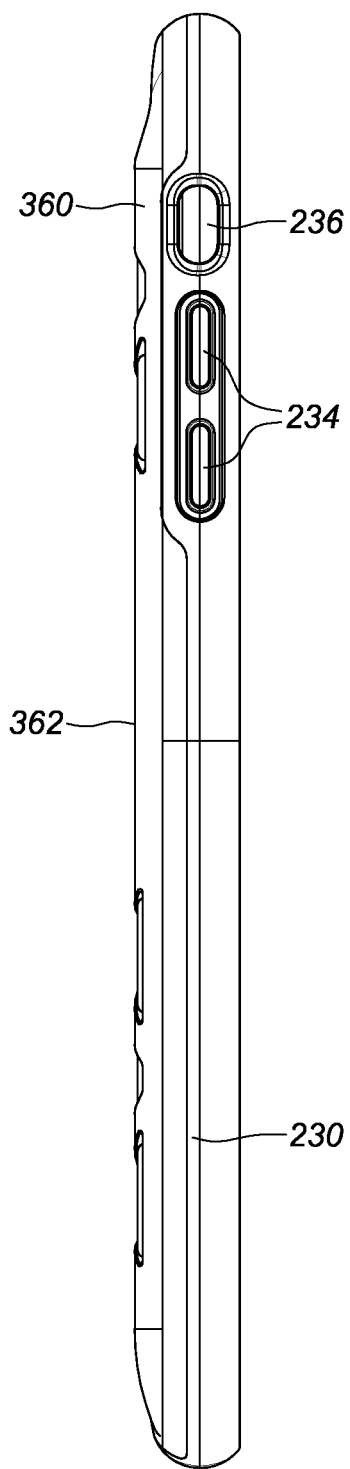
Figure 1D:
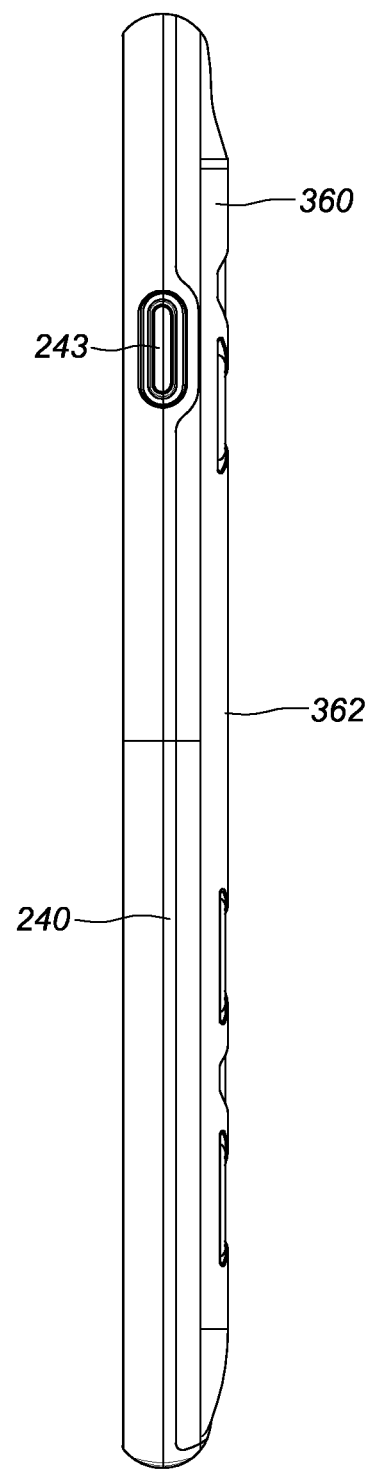
Figure 1E:
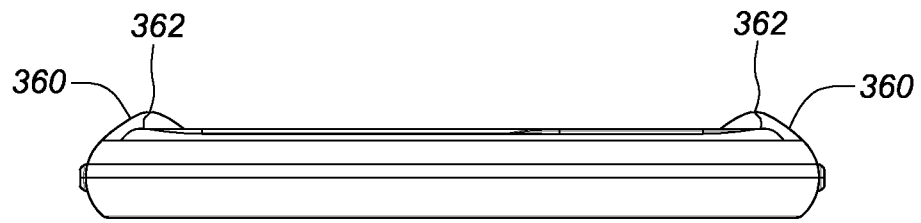
Figure 1F:
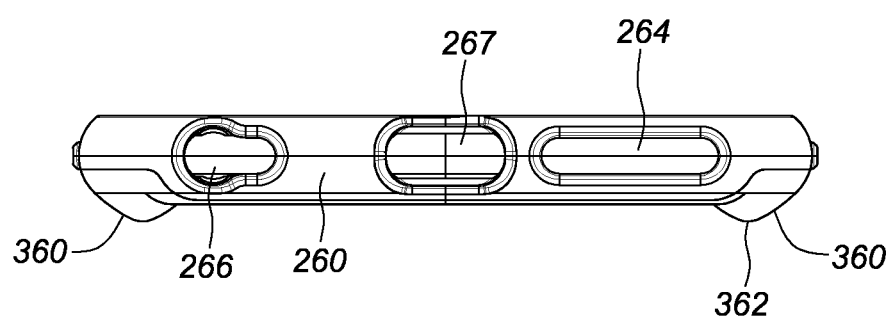
Figure 2:
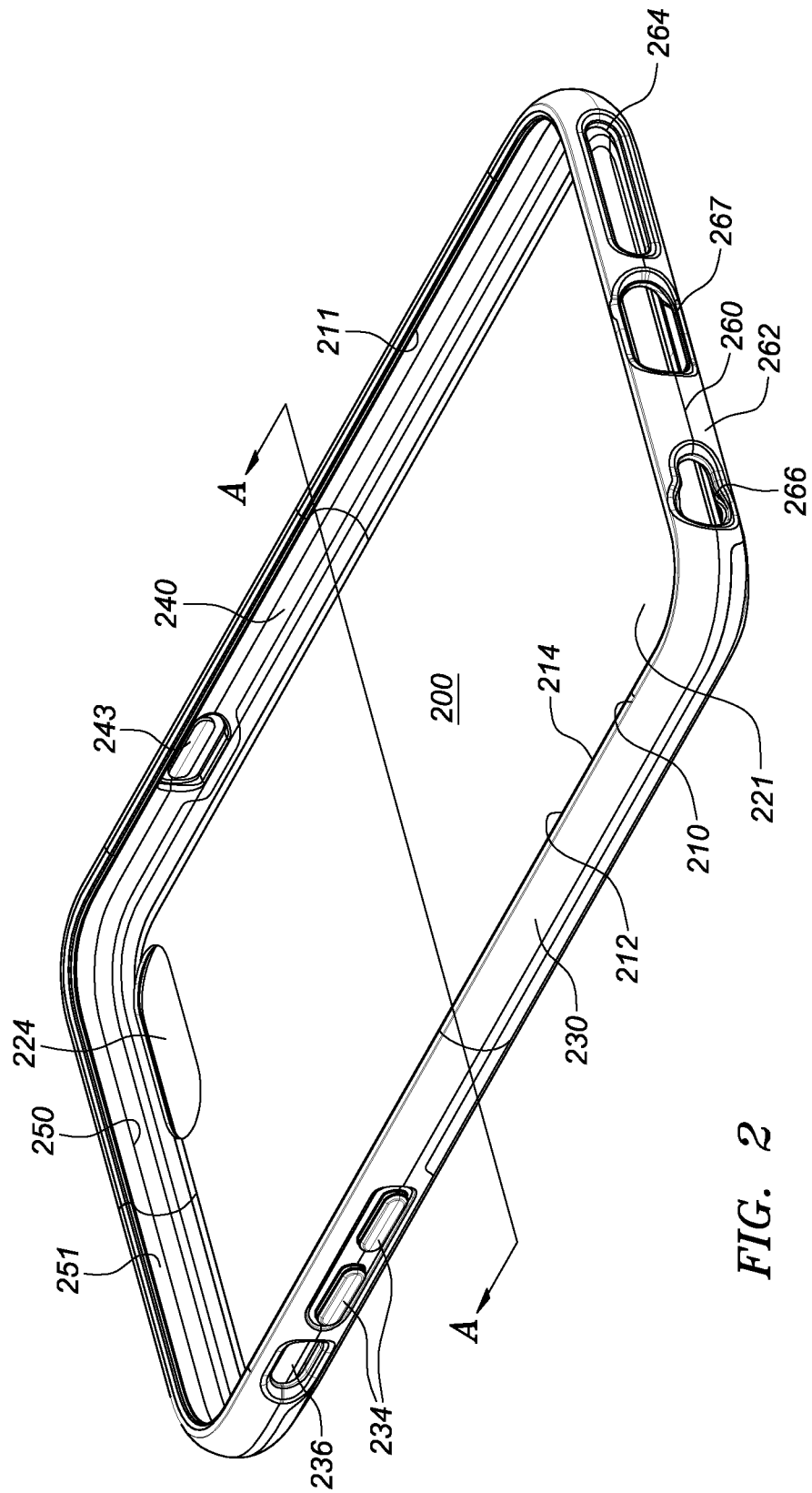
FIG. 2 is a front face perspective view of the protective case illustrated in FIGS. 1A-1F.

Each drawing is generally to scale and hence relative dimensions of the various layers can be determined from the drawings.

DETAILED DESCRIPTION OF THE PREFERRED EMBODIMENT

As summarized above and illustrated in the drawings, disclosed herein are various aspects of a protective case for a mobile device capable of providing additional reinforcing support to mitigate or prevent bending of the device while minimizing bulkiness and weight, yet maintaining a high level of protection. Aspects of which are summarized above and illustrated in the drawings.

Commonly disclosed in FIGS. 1-6 is a protective enclosure or case 200 for a mobile device (not shown) that illustrate, by way of example only, various of the configuration and construction aspects of the case. In this particular implementation, the case is configured for an Apple iPhone 6 Plus® mobile or smart phone device. It should be understood, however, that the case may be configured for any mobile device or electronic device, including but not limited to portable or cellular phones, PDAs, MP3 or audio/video devices, gaming devices, laptop computers or computing tablet devices. The case 200 is generally comprised of a multilayered construction comprising layers 300, 500 of relatively different rigidity, and one or more reinforcing support members 400 extending there-through and being formed of an even more rigid material.

As best depicted in FIGS. 1A-1F, the protective case 200 includes front and back face walls 210, 220 and left-side and right-side walls 230, 240 and top-side and bottom-side walls 250, 260, respectively. The side walls 230, 240, 250, 260 reside between the front and back faces. Each of the walls 210, 220, 230, 240, 250, 260 are dimensioned to correspond in dimension to the front and back faces, and left, right, top and bottom sides of a mobile device, respectively. In the illustrated embodiment, the case 200 is generally rectangular in shape extending longitudinally from the bottom to the top side walls 260, 250 with the left and right sides 230, 240 being the opposing long sides and the top and bottom sides 250, 260 being the opposing short sides of the rectangle More specifically, the front face wall 210 is defined by inner and outer surfaces 211, 212 and includes an inwardly projecting retention lip or rim 214 (best illustrated in the cross-sectional views of FIG. 4). The retention rim 214 is positioned to reside over the perimeter region of the front face of the mobile device to assist in retaining the mobile device within the case 200. The retention rim 214 may encircle a portion or the entire perimeter of the front face of the mobile device. For example the retention rim 214 may be configured to extend at regions of the top, bottom, left and/or right sides of the mobile device in any combination thereof. The back face wall 220 is also defined by inner and outer surfaces 221 and 222 and may include a camera lens and flash opening or aperture 224 extending there-through.

The left side and right side walls 230, 240 are also each defined by inner and outer surfaces 231, 232 and 241, 242, respectively. The left side wall 230 may further include volume control buttons 234, which like the other buttons described herein, are positioned, dimensioned, configured and adapted to being depressed by the user so as to interface and actuate the volume control buttons on the mobile device, yet revert back to the undepressed position when the user removes pressure from the button. Also included in the left side wall 230 can be an opening or aperture 236 that is positioned and dimensioned to correspond with the ringer silent switch of the mobile device to provide functional user access to the switch. The right side wall 240 may include a power button 243 that is positioned, dimensioned, configured and adapted to interface with the power button on the mobile device. It is contemplated that any of the side walls may include additional apertures and/or buttons to provide access or control over corresponding ports or buttons on the mobile device should the device have such controls or ports on that side.

The top side and bottom side walls 250, 260 are also each defined by inner and outer surfaces 251, 252 and 261, 262 respectively. The top side wall 250 may include (although not depicted) a mobile device button positioned, dimensioned, configured, and adapted to interface with a corresponding button on the mobile device. The buttons on the case may reside within and be connected to an aperture in a levered manner at one end or at a mid-section of the aperture, such that when pressed, the button hinges around the lever connection. The bottom side wall 260 may include aperture 264 positioned and dimensioned to correspond with the speaker grill regions on the mobile device. The bottom side wall 260 may further include a headphone jack/microphone and data/charging port apertures 266, 267 that are positioned and dimensioned to correspond with the headphone jack port and microphone opening and the data and charging port, respectively. Collectively the side walls 230, 240, 250, 260 define a perimeter 270 between the front and back faces 210, 220 of the protective case 200.

As previously noted, the case 200 may be formed of a multilayered construction that includes two layers 300, 500 that are co-molded together to form a unitary integral construct. Various aspects of these layers and their inter-relationship, construction and manufacture are described in more detail.

Figure 3A:
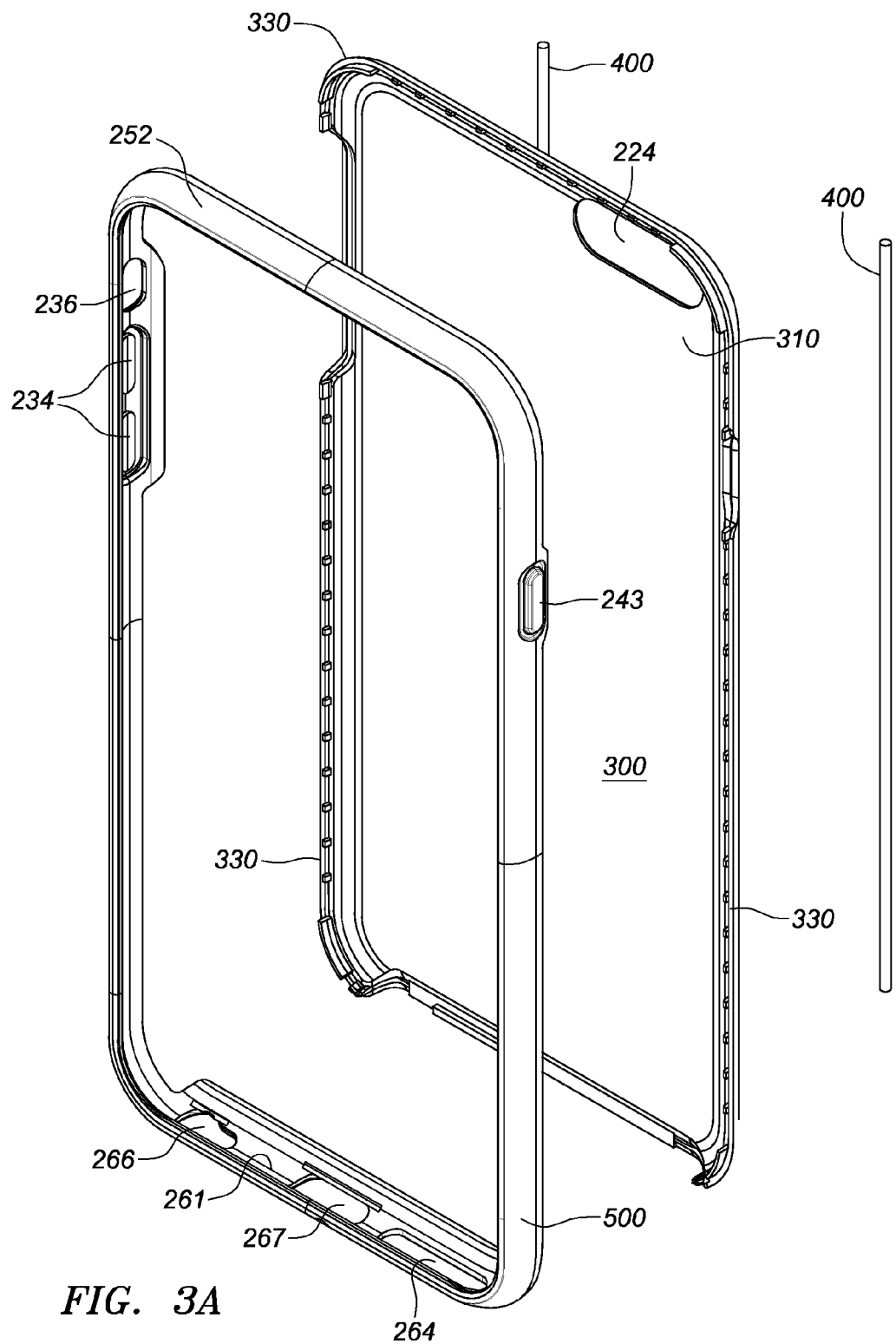
FIGS. 3A-3B are front and back perspective views, respectively, of the protective case illustrated in FIG. 2 showing the first layer, second layer and the reinforcing support member components of the case being separated from one another.
Figure 3B:
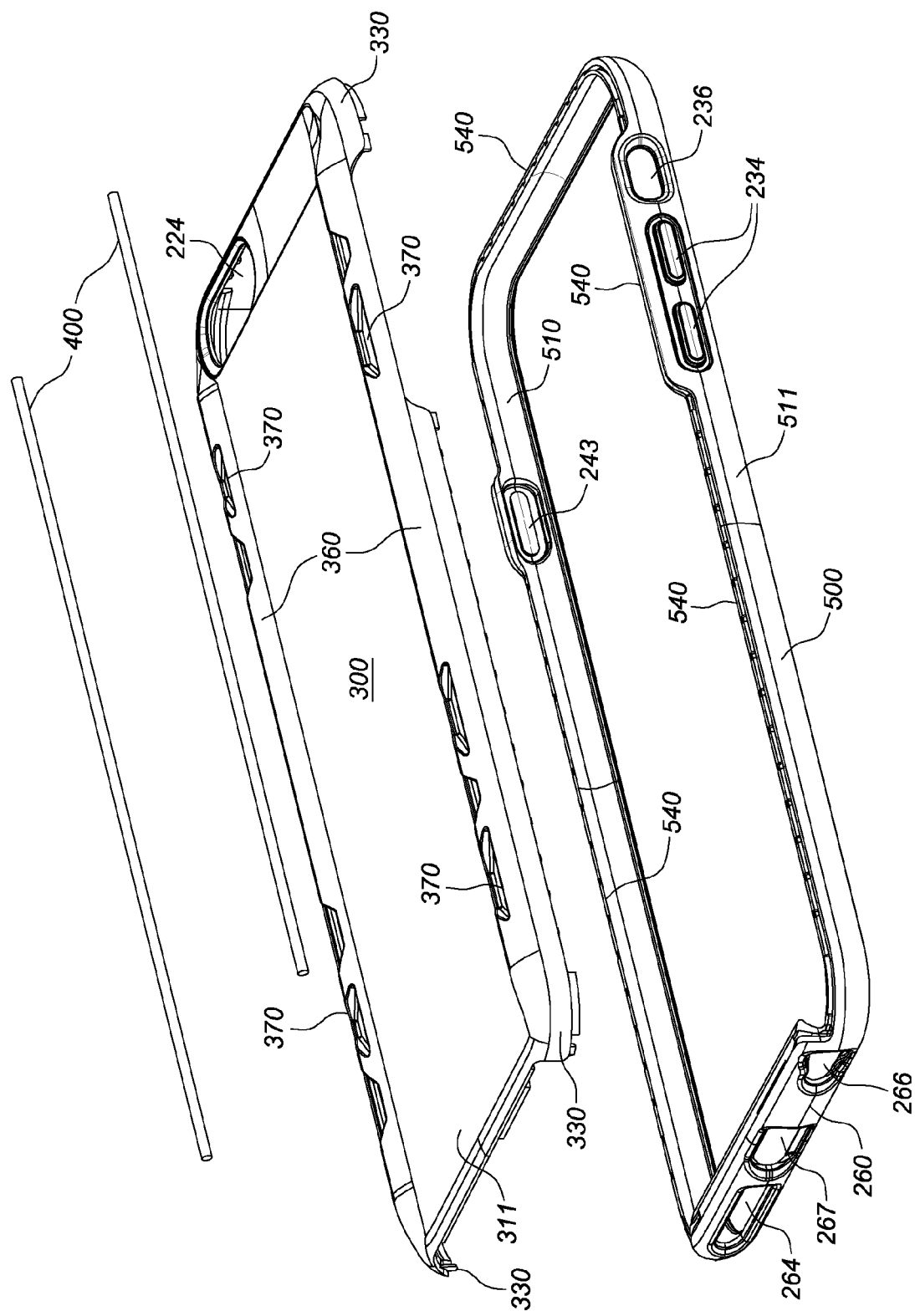
Figure 3C:
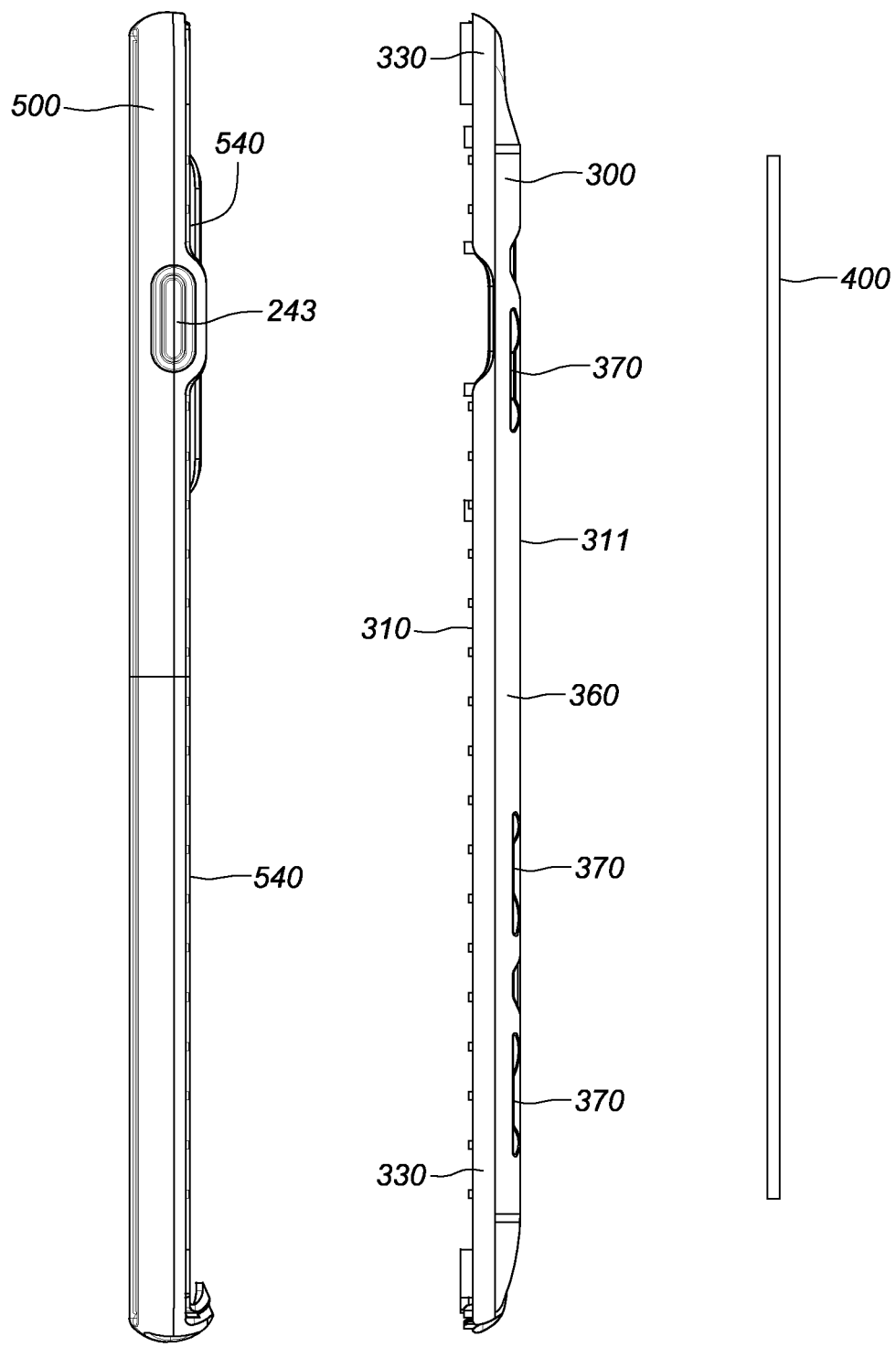
FIG. 3C is a right side view of the protective case illustrated in FIG. 2 illustrating those same components separated from one another.
Figure 4:
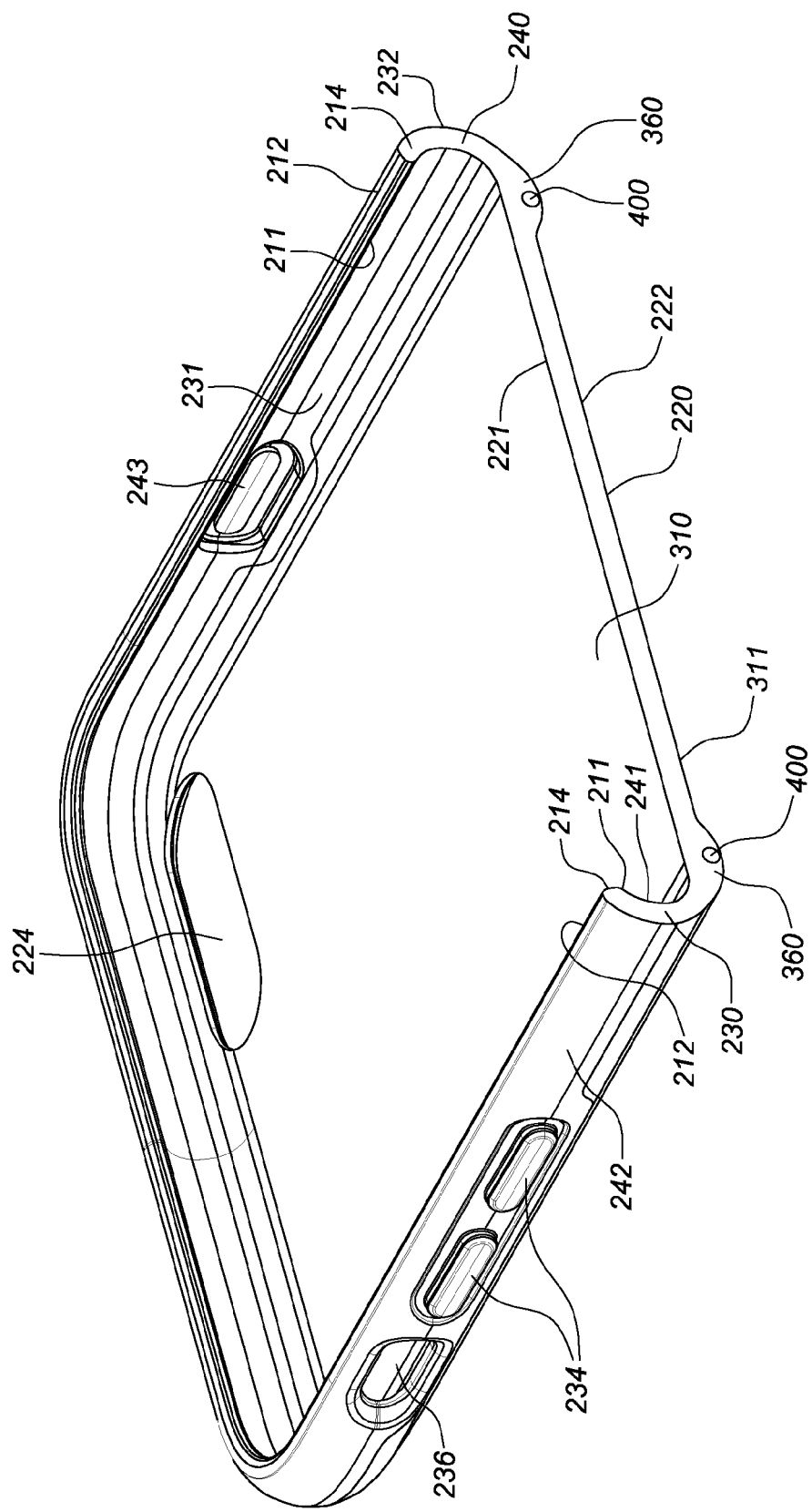
FIG. 4 is a cross-sectional view taken along plane A-A of FIG. 2 showing in greater detail the construction of the protective case and the relationship and configuration of the first layer, second layer and the reinforcing support member components.

As best illustrated in FIGS. 3A-3C, the first layer 300, which forms the lower or bottom shell portion, is defined by first inner and outer surfaces 310, 311, respectively, and dimensioned to cover the back face of the mobile device. The first layer 300 is configured to extend to the perimeter of the mobile device at the back face boundary, which is the perimeter defined by the intersection of the side walls and the back face of the mobile device.

The first layer 300 may further include a plurality of upward extending protrusions 330 positioned along the perimeter region of the first layer 300 to correspond in location with the corners and certain portions of the side regions of the mobile device. The upward extending protrusions 330 are dimensioned to reside at a height that is slightly below the height of the mobile device at those regions. However, it is contemplated that one, some or all of the upward extending protrusions 330 may be configured to extend at, below, or above the height of the mobile device in any combination.

The first layer 300 or bottom shell portion may be configured to cover the entire, a majority, half or less than half of the back face of the mobile device and may be configured to extend to or around the entire, a majority, half or less than half of the perimeter of the mobile device at the back face boundary.

In the illustrated implementation, the first layer 300 is configured to cover nearly the entire back face of the mobile device, with the exception of the flash and camera lens window aperture 224 and the entire perimeter of the back face. It should be understood, however, that alternative configurations may be employed. Perimeter regions in the first layer 300 that reside between one or more of the corners may be removed. Mid-section regions of the layer 300 may be removed to allow for access to, or user utilization of, user controls, additional touchscreen interface, and/or other device features (e.g., speakers, cameras, lights, microphone, etc.) that are located on the side walls and/or back face of the mobile device.

The first layer 300 may further include one or more outwardly and rearwardly extending protrusions 360. The outwardly extending protrusions 360 are configured to extend longitudinally along opposing sides lengthwise on the backside of the case outwardly away from the backside of the electronic device housed therein. Each of the outwardly extending protrusions 360 may include one or more retention cavities 370 that extend longitudinally with the length of the outwardly extending protrusion 360. Each of the cavities 370 is dimensioned to receive and house a reinforcing support member 400. The outwardly extending protrusions may also include one or more windows or apertures 380 that allow the reinforcing member to be visual seen by the user to facilitate visual detection as to whether a reinforcing member is fractured or stressed or to confirm that it remains undamaged and in sound condition.

Figure 5A:
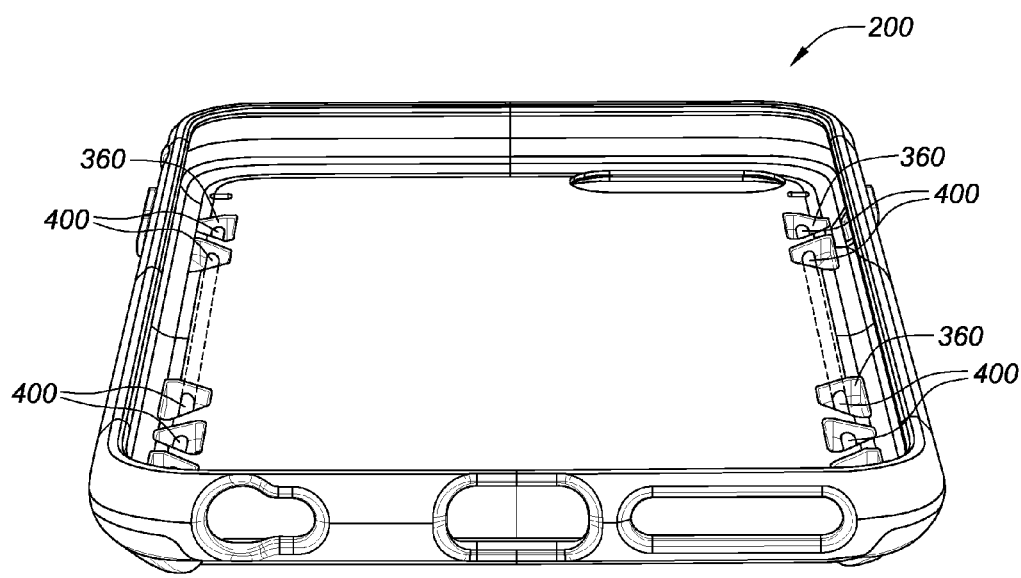
FIGS. 5A-5B are front and back face end perspective views, respectively, of another embodiment of the protective case for a mobile device that further illustrate the construction of the protective case and the relationship of the first layer, second layer and reinforcing support members.
Figure 5B:
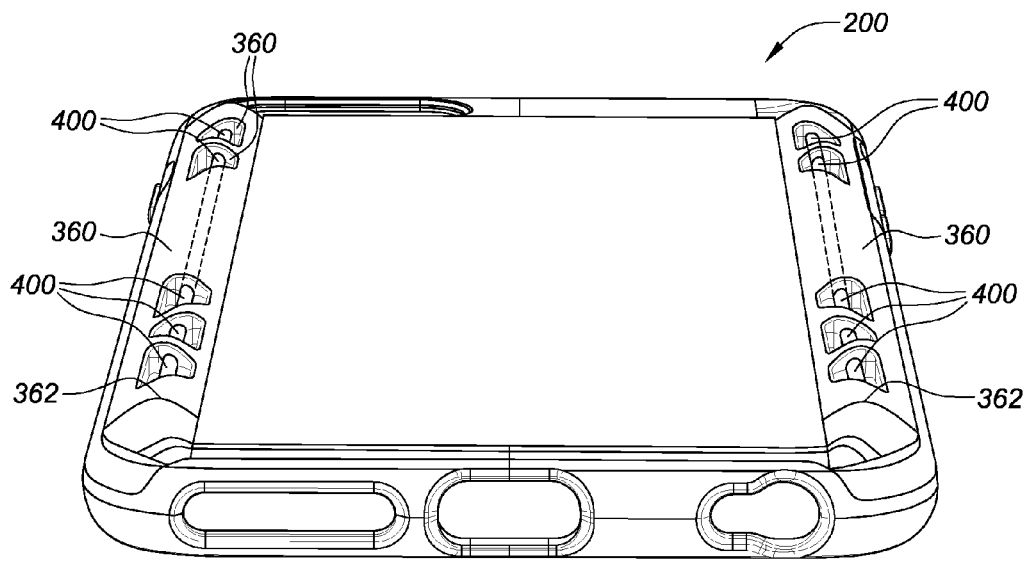

FIGS. 5A-5B are front and back face end perspective views, respectively, of another embodiment of the protective case for a mobile device that further illustrate the construction of the protective case and the relationship of the first layer, second layer and reinforcing support members. As shown in FIG. 5A, the front face of the protective case includes cavities 370 (see also FIGS. 3B-3C) to reveal the reinforcing support member 400. In another embodiment, no cavity is formed in the front face of the protective case, however, the first layer 300 may be made of a transparent or semi-transparent material to reveal the reinforcing support member 400 (formed of a darker or distinctly colored material residing there beneath).

Figure 6:
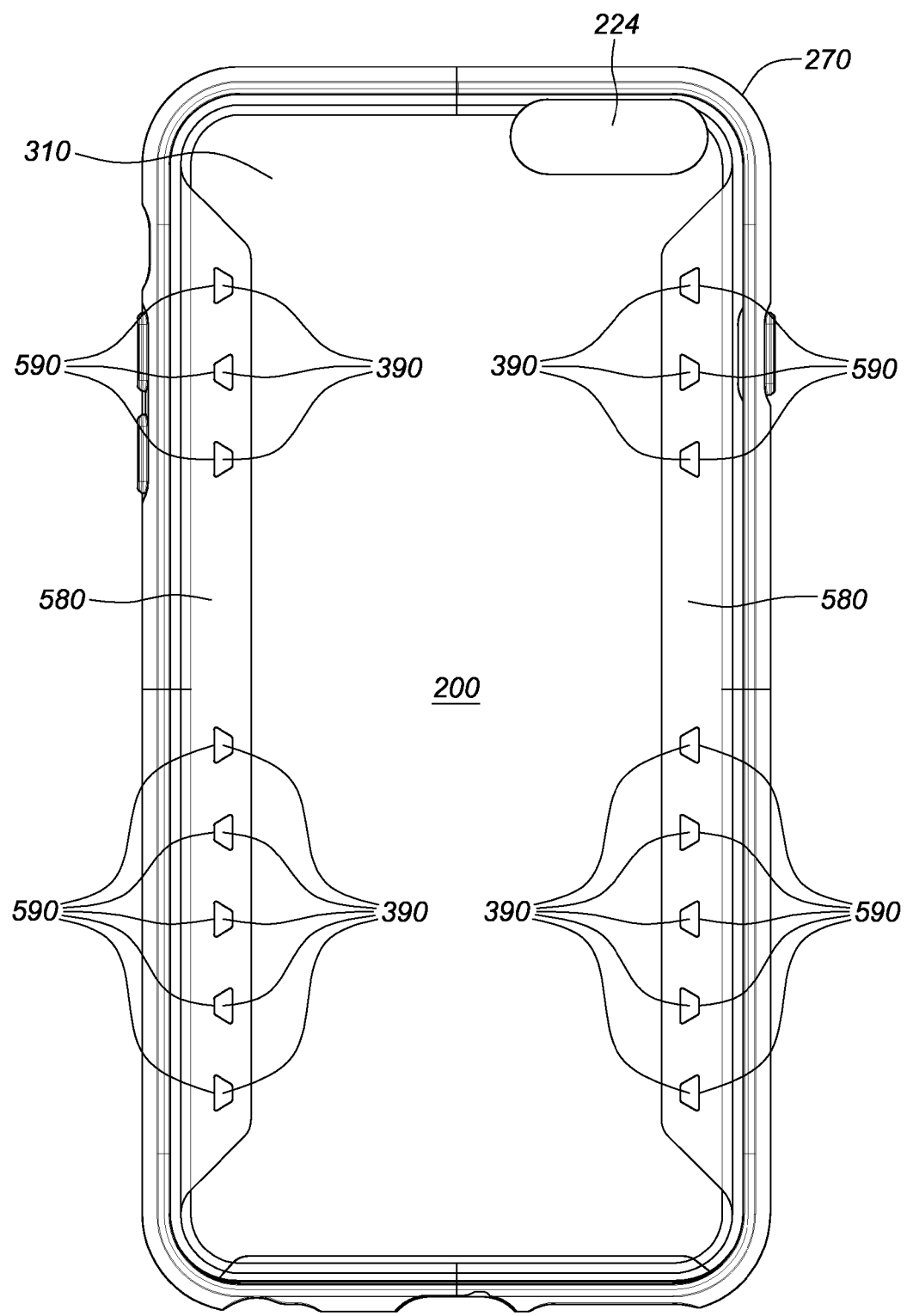
FIG. 6 is front face view of one embodiment of the protective case for a mobile device that further illustrate the tabs and interlocking mechanism thereof.

FIG. 6 is front face view of one embodiment of the protective case 200 for a mobile device. As shown in FIG. 6, the front face of the protective case may include tabs 580 extending from the second layer 500 along the left and right side walls and overlaying a portion of the inner surface 310 of the first layer 300 to provide additional support. Although each of the tabs 580 are shown as a continuous piece on each side, it is also contemplated that a break or breaks may be applied to each of the tabs so that each side can have multiple tabs. The tabs 580 may have apertures 590 sized to receive elevated protrusion members 390 extending from the inner surface 310 of the first layer 300 to form interlocking mechanism.

The reinforcing support member 400 may be made of any suitable material or combination of materials. It is contemplated, for example, that the one or more reinforcing support members may be formed of metal or metal alloy such as a steel, stainless steel, tungsten, titanium or magnesium alloy and/or may be formed of a composite fiber reinforced structure or lay-up of directionally oriented fibers and/or non-directionally oriented (e.g., randomly oriented) fibers with or without an internal core component or substrate. The reinforcing support members may circular, oval, square or rectangular in cross-section. The purpose of the reinforcing support member 400 is to provide additional support and rigidity to the phone via the protective case 200.

The second layer 500, which forms the upper portion, is also defined by inner and outer surfaces 510, 511, respectively. The second layer 500 is generally more flexible and is dimensioned to cover the top, bottom, right and/or left sides of the mobile device and forms the inwardly projecting lip or rim 214 of the front face wall 210 that serves to extend over the perimeter of the front face of the mobile device so as to assist in retaining the device within the case 200.

While in the illustrated embodiment, the second layer 500 extends around the entire perimeter of the mobile device, it may be configured elsewise. Thus, it is contemplated that the second layer 500 may cover the entire, a majority, half or less than half of the top, bottom, right and/or left sides of the mobile device and/or may be configured to extend around less than the entire, a majority, half or less than half of the perimeter of the mobile device in any combination. The second layer 500 includes the one or more mobile device control apertures that extend through the layer and/or control buttons (e.g., 234, 236, 243, 264, 266, 267) that are dimensioned and positioned to allow access to and/or control to the control buttons and/or ports (e.g., power button, volume button, ringer silent switch, headphone jack, microphone opening, speaker grill, and data/charging port) on the mobile device. The second layer 500 may also further include one or more overlapping indentations 540 in the inner surface 510 at regions configured to reside at portions of the sides and corners of the mobile device. The indentations 540 are configured or molded so as to be in the negative image of the upward extending protrusions.

While, the first and second layers 300, 500 may be co-molded to form an integrated construction, it should be understood that it is contemplated that only portions of one or more of the layers may be co-molded, or each of the layers may be separately formed and mechanically attached to one another by clips, snaps or latches between each of the components or between for example the third layer and the first layer. A combination of co-molding and mechanical attachment of the layers or portions thereof may also be employed.

In a fully integrated or co-molded construction, the case 200 would be properly dimensioned and have sufficient flexibility to allow the user to insert and remove the mobile device without damaging to the case 200 or the device. The flexibility may be implemented via the construction materials employed (e.g., having a relatively softer more pliable upper shell portion and more rigid bottom shell portion to allow the device to be inserted into the window defined by the upper shell) and the configuration of the layers or components.

When the components are modular or separable from one another, the user may wrap the second layer around the mobile device and then clip the first layer into position onto the second layer and around the device, or vice versa (e.g., position the device into the first layer and clip the second layer into the first layer around the device). The clips, snaps, hooks, or other mechanical attachments may be formed or molded into: (a) two or more of the layers at their perimeter regions, (b) one or more of the upwardly extending protrusions 330 and/or indentions 540 in the first and second layers 300, 500, (c) the control buttons 234 and corresponding apertures on the first and second layers 300, 500 and/or (d) at any region where two layers are in contact or in proximity to one another. Thus, a combination of co-molding and/or mechanical attachment of the layers may be employed.

The materials that form the layers may be selected based on their hardness or rigidity. For example, the first layer 300 may be made of a first material that has a first hardness or rigidity, and the second layer 500 (including the tabs 580) may be made of a second material that has a second hardness or rigidity that is different from the first hardness. In a preferred implementation, the first hardness is greater than the second hardness and the first rigidity is greater than the second rigidity.

The first and second layers 300, 500 may be formed of a composition comprised of one or more materials including but not limited to polycarbonate; thermoplastic urethane (TPU), thermoplastic elastomer (TPE), acrylonitrile butadiene styrene (ABS), nylon, metal, silicone rubber, or any combination thereof. For example, the first layer 300, which is the harder and more rigid of the two layers, may be formed of a composition comprised of polycarbonate (PC), a combination of polycarbonate and ABS, nylon, fiber reinforced plastic, and/or metal. The second layer 500, which is the relatively less rigid, softer layer, may be formed, for example, of a composition comprised of TPU and/or TPE or combination thereof or other polymer or suitable material.

In a preferred implementation, the first layer 300 may have a Shore A durometer hardness that is 50% or more greater than the second layer 500, 40% or more greater than the second layer 500, 30% or more greater than the second layer, 20% or more greater than the second layer, or 10% or more greater than the second layer all +/−5% as measured using the American Society for Testing and Materials (ASTM) standard D2240. The first layer may have a Shore A durometer hardness of 100+/−15, 100+/−10, or 100+/−5, or 100 as measured using the American Society for Testing and Materials (ASTM) standard D2240. The second layer may have a Shore A durometer hardness of 65+/−15, 65+/−10, 65+/−10, or 65 as measured using the American Society for Testing and Materials (ASTM) standard D2240. It should be understood that the two layers may be formed of materials having a Shore A hardness that is comprised of any combination of hardness described above. Thus, for example the first layer may be formed of a material having a Shore A durometer hardness that is 100+/−5 while the second layer may be formed of a different material having a shore A durometer hardness of 65+/−15.

Each of the one or more reinforcing support members 400 may be preferably formed of a material that is even more rigid and harder than the material that forms either the first layer/bottom shell portion 300 or the second layer/upper portion 500. It is also preferable that the support members 400 be relatively small, for example for the iPhone 6 Plus case as illustrated, preferably 3 mm and/or less in cross-sectional width, height or diameter to avoid adding bulk, and even more preferably 2.5 mm or less in cross-sectional width, height, and/or diameter, and yet even more preferably 2 mm or less in cross-sectional width, height, and/or diameter, and yet even more preferably 1.5 mm and/or less in cross-sectional width, height, and/or diameter, and yet even more preferably 1.0 mm and/or less in cross-sectional width, height, or diameter. The cross-section being understood to be taken at a plane cutting transversely at a right angle to the longest axis of the member 400.

A method of manufacturing the protective case 200 for a mobile device is also disclosed. The case may be manufactured by placing the reinforcing support members 400 (e.g., steel rod) in a mold configured to define the shape of the bottom shell portion 300. The reinforcing support members 300 are dimensioned and positioned in the desired manner relative to the configuration of the bottom shell portion 300. For example, they may be dimensioned and positioned to run lengthwise near or under the longitudinally extending edges of the electronic device so as to extend between the top to the bottom sides or ends of the device and/or case on the right and/or left sides thereof. Multiple reinforcing support members may employed that are formed of the same and/or different materials (which may be harder or more rigid than one or more of the other members 400 employed in the case 200) and may be positioned along or under the left and/or right sides of the electronic device or positioned more centrally and inwardly from the left and right side walls 230 and 240, respectively.

Thus, it is contemplated, for example, that multiple reinforcing support members 400 may be employed and that those members may be formed of materials that have the same, or different hardness and rigidity. Staggering or stepping the hardness or rigidity or other material properties of multiple reinforcing support members 400 incorporated into the case, allows flexibility in the manner the case 200 performs under stress to resist bending. Thus, for example, the user could inadvertently stress the electronic device (e.g., by sitting on it or jamming it into a brief case), the force could fracture or visibly strain one (e.g., the more rigid member) of reinforcing support members 400 but may be insufficient to visibly strain or fracture another support member 400 (e.g., the less rigid member). The electronic device could therefore continue to be afforded reinforcement and protection, yet the user would be warned by virtue of the visible fracture or strain on the deformed reinforcing support member that undue stress has been applied to the device and can therefore take corrective measures to avoid damaging the device.

Similarly, the use of materials having different physical properties may provide additional advantages. For example, a metal rod may be employed to form one of the support members and a more rigid polymer (or fiber reinforced polymer) may be employed to form another of the support members having a greater bending stiffness than the member formed of the metal rod. The case 200 could, therefore, be capable of providing strong resistance to bending forces via the more rigidly formed support member(s), yet the one or more malleable metal rods that form the other support members 400 may continue to provide support even when those more rigid members fracture or fail under excessive stress. Additionally, the user could bend the metal rods, to the extent deformed, back into alignment, even though the more rigid polymer members have been fractured. The case thereby may continue to provide the device added reinforcement support.

While the illustrated embodiment depicts two support members 400 extending on opposing sides of the case along the left and right long sides of the case 200, it should be understood that the case 200 may employ fewer or more support members and that one or more such support members may be oriented diagonally or perpendicularly to the long-side of the case. Such diagonally and/or perpendicularly oriented support members may be in addition to those oriented lengthwise as depicted or may be employed instead of one or more of the lengthwise oriented support members.

Once the one or more reinforcing members 400 are positioned in the desired location in the mold, the mold is injected with a first polymer material (e.g. PC) on top of the reinforcing support members 400 to form a first molded construct in the form the bottom shell portion 300 and the reinforcing support members 400 contained or housed therein. The first molded construct is then inserted into another mold compartment that is configured to form the upper portion 500 of the case 200. Once the first molded construct is positioned in the second mold, the second mold is injected with a second more pliable polymer material (e.g. TPU) that is co-molded to the first molded construct and the first polymer material to thereby form second molded construct, which in the illustrated embodiment would be the case 200.

While the illustrated embodiment is described as being formed of two co-molded layers, it should be understood that additional layers may be molded to form the case and that any of the molded constructs could be incorporated into another molded or unmolded component such as a wallet or folio. In addition, while the illustrated embodiment is described as incorporating reinforcing support members in the bottom portion of the shell 300, it should be understood that the reinforcing support members may be incorporated into the upper shell portion 500 along one or more of the side walls or along overlapping regions of the upper and lower shell portions and that incorporating such reinforcing support members into the supper shell portion 500 may be in addition or as a substitute to those in the lower shell portion 300. To the extent reinforcing support members are incorporated into the upper shell portion 500, those members may be positioned in the mold in the desired location when the upper portion 500 is molded. The upper portion 500 could be molded before or after the lower portion 300, and then the two portions being co-molded together to form an integral case construct.

When reinforcing support members 400 are incorporated into the upper portion 500, such members may be incorporated into one, two, three or all four sidewalls 230, 240, 250, 260 lengthwise along a portion or the entirety of the sidewalls and/or into the front face wall 210. The reinforcing support members 400, for example, may be incorporated to run lengthwise along the base of any, some or all of the sidewalls, and/or may run lengthwise along the mid or upper region of those sidewalls nearer the front face wall 210. When such members 400 are incorporated into the front face wall 210, such members 400 may run lengthwise on one, two, three, or four sides of the front face wall 210 and may be contained or co-molded within the inwardly projecting rim or lip 214. In order to provide flexibility in the upper portion 500 to facilitate insertion and removal of the mobile device into and out of the case 200, it may be preferable not to include such members 400 in all the sides or portions of the upper regions, such as the corner regions and/or regions surrounding the buttons and apertures.

Reinforcing support members 400 may be incorporated into the case 200 with reference to structural analysis of the mobile device. Thus, for example such reinforcing support members 400 may be incorporated in the case to be configured to be at or near regions of the mobile device that are prone to bending, such as around end regions or underlying areas of structural weakness such as near buttons or apertures. Thus, a preferred implementation would include one or more reinforcing support members 400 that are configured to reside in proximity to such areas of structural weakness.

The various aspects relating to configuration and construction of each of the two component layers described above or otherwise herein and/or illustrated in the drawings may be formed during the molding process.

Each of the foregoing and various aspects, or teachings herein together with those set forth in the claims and described in connection with the embodiments of the protective cases summarized above or otherwise disclosed herein including the drawings may be combined to form claims for a device, apparatus, system, method of manufacture, and/or use without limitation.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the various aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A rectangular shaped protective case for a mobile electronic device configured to be user removable from said mobile electronic device, wherein said mobile device includes a height that is defined as the distance between a front face and a back face of the mobile device, a perimeter defined by top, bottom, right, and left sides residing between the front and back faces, and corners defined at the intersecting regions of the sides, said protective case comprising:

a bottom shell portion made of a first material that is dimensioned to cover at least a portion of the back face of the mobile device;

an upper portion that is co-molded to the bottom shell that is made of a second material that is less rigid or hard than the first material, wherein the upper portion is configured to cover at least a portion of the perimeter region of the front face of the mobile electronic device; and one or more longitudinally extending reinforcing support members being housed within the bottom shell portion and made of a third material that is more rigid than either the first or second material, wherein said reinforcing support members extend lengthwise generally parallel to the long sides of the protective case.

2. The protective case of claim 1, wherein one or more of said one or more reinforcing support members is molded within said bottom shell portion.

3. The protective case of claim 1, wherein one or more of said one or more reinforcing support members is constructed of metal.

4. The protective case of claim 1, wherein one or more of said one or more reinforcing support members is formed of cured fiber reinforced plastic construct that is molded within said bottom shell portion.

5. The protective case of claim 1, wherein one or more of said one or more reinforcing support members is in a form of a longitudinally extending beam, which includes a rectangular cross-section having a width and height dimension of 3 mm or less.

6. The protective case of claim 1, wherein one or more of said one or more reinforcing support members is in a form of a longitudinally extending beam, which has a circular cross-section having a diameter of 1.5 mm or less.

7. The protective case of claim 1, wherein said bottom shell fixedly houses a first reinforcing support member on first side of the case and a second reinforcing support member on an second side of the case that is opposite said first side.

8. The protective case of claim 1, wherein said bottom shell fixedly houses a first group of multiple reinforcing support members on a first side of the case and a second group of multiple reinforcing support members on a second side of the case that is opposite said first side.

9. The protective case of claim 8, wherein the reinforcing support members in the first group have different cross-section dimensions and differing lengths.

10. The protective case of claim 9, wherein the reinforcing support members in the second group have different cross-section dimension and differing lengths.

11. The protective case of claim 7, wherein the first reinforcing support member is identical to the second reinforcing support member.

12. The protective case of claim 7, wherein one or both of the first or second reinforcing support members has greater dimensions in a region configured to be positioned near control buttons on the mobile electronic device.

13. The protective case of claim 7, wherein one or both of the first or second reinforcing support members is constructed to be more rigid in a first region than adjacent second region.

14. The protective case of claim 7, wherein one or both of the first or second reinforcing support members is constructed to be thinner in a first region than adjacent second region.

15. The protective case of claim 7, wherein one or both of the first and second reinforcing support members is constructed to have a cross-section having an area in a first region that is greater than the area of the cross-section taken at a second region that is separated a first longitudinally extending distance away from said first region.

* * * * *